July 3, 1934.   M. BOWMAN-MANIFOLD ET AL   1,964,765
PHOTOGRAPHIC CAMERA AND PICTURE PROJECTING AND VIEWING APPARATUS
Filed Sept. 5, 1930
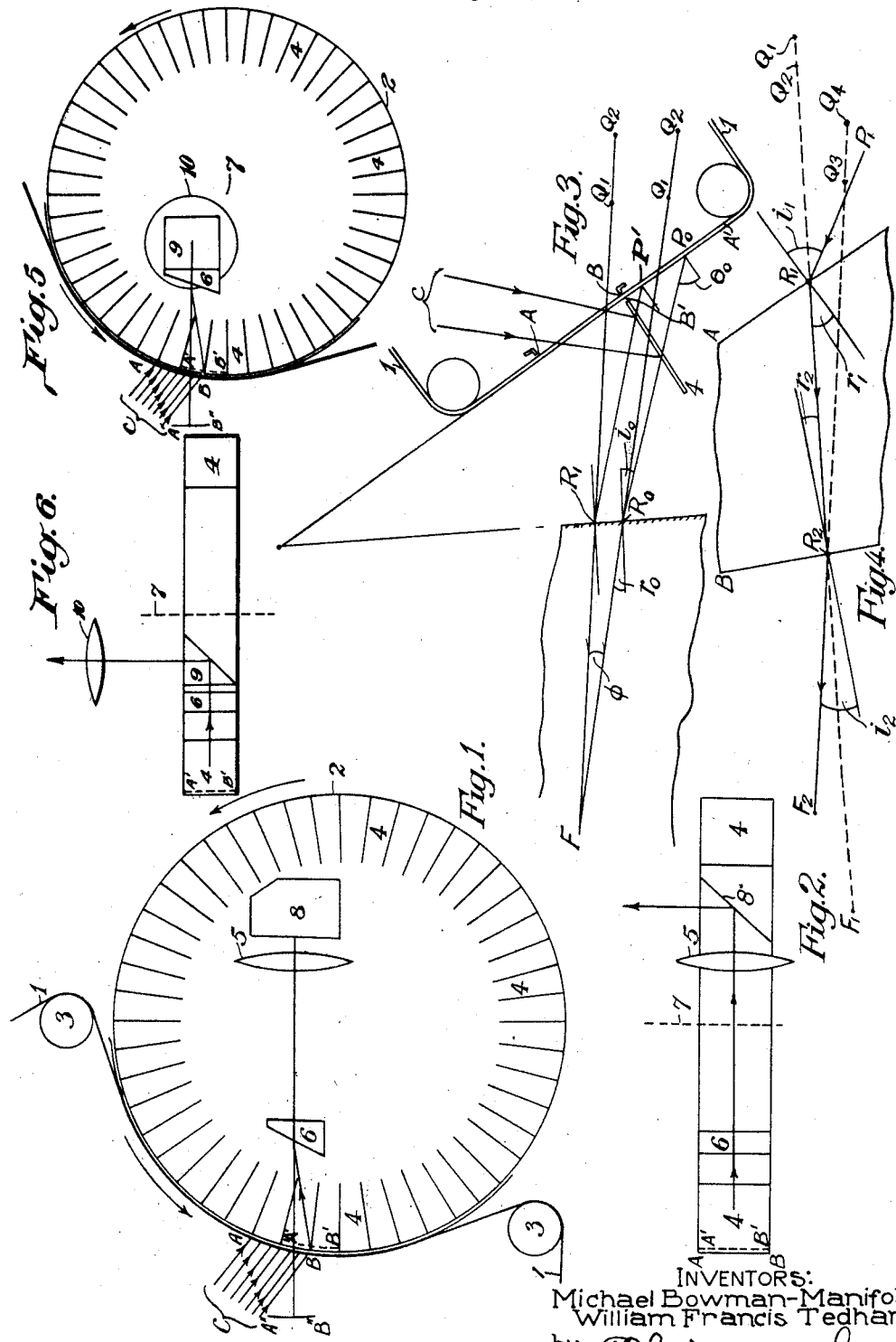
INVENTORS:
Michael Bowman-Manifold,
William Francis Tedham,
by
THEIR ATTORNEY.

Patented July 3, 1934

1,964,765

UNITED STATES PATENT OFFICE 1,964,765

PHOTOGRAPHIC CAMERA AND PICTURE PROJECTING AND VIEWING APPARATUS

Michael Bowman-Manifold, Worplesdon Station, and William Francis Tedham, Abbey Wood, London, England, assignors to Victor Talking Machine Company, a corporation of New Jersey Application September 5, 1930, Serial No. 479,820
In Great Britain September 6, 1929

5 Claims. (Cl. 88—16.8)

The present invention relates to photographic cameras and picture projecting and viewing apparatus.

The present invention is concerned with apparatus for projecting, viewing or taking pictures, whether moving or stationary, of the kind in which the path of the light between an object, of which an image is to be produced, and this image, leaves the object, or reaches the image, other than normally.

In our earlier patent application Ser. No. 466,626 filed July 9, 1930 there is described moving picture projecting apparatus in which a stationary image of a moving film is formed along the arc of a circle by means of plane mirrors disposed radially with respect to said circle and rotated concentrically with the film. The stationary image is used as the object and an image of it is projected in the usual way onto a screen. Since, in that apparatus, the light from the stationary image (or object) must fall obliquely upon the radial mirrors, it will be clear that the light reflected from the radial mirrors cannot be normal to the chord of the arc along which the object lies. In other words, the light available for projection purposes leaves the object obliquely, and therefore no ordinary lens can form an image of the film which is evenly focussed.

According to the present invention, in apparatus of the kind specified, optical means are provided in the light path, between the object and the image, whereby said image may be substantially evenly focussed.

Further, according to the present invention, in apparatus of the kind specified, there is provided, in the light path between the object and image, an optical system comprising a prism adapted to refract the light through an acute angle.

The invention will be described, by way of example, as applied to the type of projector described in the earlier patent application above referred to, and with reference to the accompanying drawing, in which Fig. 1 shows, somewhat diagrammatically, in elevation, the position of the obliquity correcting prism relative to the radial mirrors and to a projection lens, in the case when the light rays passing through the film are parallel.

Fig. 2 is a plan view of the optical system of Fig. 1.

Fig. 3 is a diagram showing the path of the rays from the object to an image formed by refraction in the first face only of the correcting prism, in the case when the light rays passing through the film are convergent, and Fig. 4 shows the path of the rays from the object to the final image formed by the complete prism, in the same arrangement as is illustrated in Fig. 3, that is to say, in the case when the light rays are convergent.

Fig. 5 shows a modification in elevation similar to Fig. 1.

Fig. 6 is a plan view of the optical system of Fig. 5.

Referring to Figs. 1 and 2, in the type of projector under consideration, the film 1 is passed over a cylindrical guide drum 2 by means of rollers 3 and is illuminated, while passing the gate AB, in an oblique direction with light indicated by the arrows at C. Light from the moving film AB forms, by reflection in the radial mirrors 4, a stationary virtual image A'B' (shown dotted), and light from this stationary image passes into the central space within the radial mirrors 4. It will be clear that the light rays leave the stationary image A'B' (which may be called the object) other than normally. According to the invention, therefore, a prism 6 is arranged between the radial mirrors 4 and a projection lens 5 in such manner that the rays from A'B' are refracted through an acute angle, a virtual image of the object A' B' being formed at A" B" in a plane normal to the axis of the lens 5. An evenly focussed image of A" B" may thus be projected onto a viewing screen by the projection lens 5.

The light between the film AB and the lens 5 may be either parallel or convergent, and in any case, since it is desirable to reflect the light, either before or after passing through the lens 5, in a direction approximately parallel to the axis of rotation 7 of the radial mirrors, a plane mirror inclined at 45° to the axis of the lens 5 is placed in the position indicated by 8. Alternatively, a 45° reflecting prism 9 may be combined with the correcting prism 6, as shown in Figures 5 and 6, and in this case the projection lens 10 is used in place of the projection lens 5.

The dimensions of the prisms 6 depend upon the state of convergency of the light rays between the film 1 and the projection lens 5 (divergency being considered to be negative convergency). In the simplest case, when the convergency is zero, that is to say, when the light rays are parallel, complication due to refraction of the light when emerging from the correcting prism may be avoided by making the angle of the correcting prism equal to the angle of refraction desired for obliquity correcting purposes, so that the light emerges from the correcting prism normal to the emergent surface. If a 45° reflecting prism, is combined with the correcting prism there is thus no refraction at the interface of the two prisms nor at the emergent surface of the reflecting prism, whether the two prisms be made of glasses of the same or of different refractive indices. The dispersion which occurs at the first face of the correcting prism may be corrected by making the correcting prism in two parts, each of a different dispersion, and in this case it is convenient to make the second part of the correcting prism integral with the reflecting prism.

The desired correction for image obliquity, that is to say, the condition that the prism shall form an image of the object A' B' in a plane normal to the axis of the lens 5, may then be obtained by arranging that $$\tan \theta_0 = \tan i - \frac{\sin i \cos i}{n^2 - \sin^2 i}$$

where $\theta$ is the angle between the normal to the chord of the arc on which the object is formed and the mean direction of the light beam reflected from the radial mirror which is at any instant working, $i$ is the mean angle of incidence on the prism face, and $n$ is the refractive index of the glass of the prism. Since, in order to obtain color correction, the prism is made of two glasses, the value of $n$ in the above equation is dependent upon the refractive indices of these two glasses. The relation between the prism angle and the deviation angle for any two glasses suitable for color correction will be known and an effective refractive index for the two glasses can then be ascertained. This may, as a first approximation, be taken as the mean of the two refractive indices, and it is this value which is used in the above equation.

In general, however, the light falling upon the prism from the stationary image or object is not parallel, but convergent, and the above mentioned simple equation for obliquity correction does not hold.

The invention as applied to the case of convergent light will now be described with reference to Figs. 3 and 4.

The film 1 (Fig. 3) is assumed to move along the chord of the arc along which it actually moves. The errors introduced by this assumption are small since the length of film illuminated is small compared to the radius of the circle along which the film moves. The film 1 is illuminated, by light proceeding in the direction shown by the arrows C, over the length of a single picture AB, a stationary virtual image A'B' being formed in the moving radial mirrors 4 (of which only one is shown). The projection lens, which is not shown, but which is to the left of the figure, is placed so that its principal point F coincides with the point of convergence of the light after refraction at the first surface R R of the prism. It is found, to a first approximation, that the prism angles required are independent of the position of this point F.

The formation of the final image may be considered to take place in two steps, the first step being illustrated in Fig. 3, and both steps being illustrated in Fig. 4. Referring to Fig. 4, a ray of light from a point P in the object, will form, by refraction in the first surface A of the prism, two focal lines (passing respectively through the points $Q_1$ and $Q_2$) which in general lie in planes which are not normal to the lens axis $F_2 Q_3 Q_4$, but by refraction in the second surface B of the prism, these focal lines form images (in which $Q_3$ and $Q_4$, respectively are, points) which under certain conditions lie in parallel planes both of which are normal to the lens axis. These final images are separated by a finite distance $Q_3 Q_4$ but can be brought together by a cylindrical lens.

The mathematical procedure for obtaining the desired conditions is indicated below, and the formation of the focal lines by refraction at the first surface of the prism is illustrated in Fig. 3 in which $P_1$ and $P_0$ are two points on the stationary image A' B', which in this case is the object, $R_1$ and $R_0$ are the points of incidence on the first face of the prism of rays from $P_1$ and $P_0$, $Q_1 Q_1$ is the locus of a point in the first focal line, $Q_2 Q_2$ is the locus of a point in the second focal line, $\theta$ is the angle between the normal and the incident ray $P_0 R_0$, $i_0$ is the angle of incidence of the ray from $P_0$, $r_0$ is the angle of refraction of the ray from $P_0$, $F$ is the principal point of the projection lens, and $\phi$ is the angle between the rays refracted from $P_1$ and $P_0$.

The inclination of the first focal line $Q_1 Q_1$ to the lens axis $F Q_1$, which we shall call $\theta_1$ is:—

$$\tan^{-1}\left[\frac{d(FQ_1)}{d\phi} \bigg/ FQ_1\right]_{\phi=0}$$

and the inclination of the second focal line, $\theta_2$, to $F Q_2$ is:—

$$\tan^{-1}\left[\frac{d(FQ_2)}{d\phi} \bigg/ FQ_2\right]_{\phi=0}$$

The actual equations for $\theta_1$ and $\theta_2$ may be written down according to the well known theory of the formation of focal lines at a plane refracting surface, and are to a first order of accuracy:—

$$-\theta_1 = -n\theta_0 + \frac{(n^2-1)r_1(FR_1 - 2nR_1P_1)}{FR_1 + nR_1P_1} \quad \text{I}$$

$$-\theta_2 = -n\theta_0 + \frac{(n^2-1)r_1(FR_1)}{FR_1 + nR_1P_1} \quad \text{II}$$

The conditions for these two focal lines to be both normal to the lens axis is:—

$$\frac{d(FQ_1)}{d\phi} = 0 = \frac{d(FQ_2)}{d\phi}$$

but this is in general unobtainable and use must be made of a second refraction at the second face of the prism. The path of the rays to form the final image in this case is illustrated in Fig. 4. $Q_1$ and $Q_2$ now become the objects for this second refraction and $Q_3$ and $Q_4$ are points in the final images.

$i_1$ is the angle of incidence at the first surface, $r_1$ is the angle of refraction at the first surface, $r_2$ is the angle of incidence at the second surface, $i_2$ is the angle of emergence at the second surface, $f$ is the focal length of the projection lens, $d$ is the distance traversed in the prism by the mean refracted ray, and $F_1$ is the conjugate, in the second surface, of $F_2$. Then, as before, the inclinations of the final images to the axis of the projection lens are $$\theta_3 = \tan^{-1}\left[\frac{d(F_2Q_3)}{d\phi} \bigg/ f\right]_{\phi=0}$$

$$\theta_4 = \tan^{-1}\left[\frac{d(F_2Q_4)}{d\phi} \bigg/ f\right]_{\phi=0}$$

and these images are normal to the lens axis when $$\theta_3 = \theta_4 = 0$$

The values of $\theta_3$ and $\theta_4$ are found by substituting in the Equations I and II $\theta_1$ and $\theta_2$ respectively in place of $\theta_0$ $\frac{1}{n}$ in place of $n$ $i_2$ in place of $r_1$ $R_2 Q$ in place of $P_1 R_1$ and $F_2 R_2$ in place of $F R_1$.

Performing these substitutions, we have $$\theta_3 = \theta_0 - \left(n-\frac{1}{n}\right)r_0\left(1-\frac{3R_1P_1}{f}\right) + \left(n-\frac{1}{n}\right)r_1\left[1-\frac{3\left(\frac{d}{n}+R_1P_1\right)}{f}\right] \quad \text{III}$$

and $$\theta_4 = \theta_0 - \left(n-\frac{1}{n}\right)r_1\left(1-\frac{R_1P_1}{f}\right) + \left(n-\frac{1}{n}\right)r_2\left[1-\frac{R_1P_1+\frac{d}{n}}{f}\right] \quad \text{IV}$$

Putting $\theta_3 = \theta_4 = 0$ (the desired normality condition)

$$r_1 = \theta_0 \frac{\left(1+\frac{R_1P_1}{\frac{d}{n}}\right)}{n-\frac{1}{n}}$$

and $$r_2 = \theta_0 \frac{\left(\frac{R_1P_1}{\frac{d}{n}}\right)}{n-\frac{1}{n}}$$

$i_1$ and $i_2$ may now be found from the two equations $$n = \frac{\sin i_1}{\sin r_1} = \frac{\sin i_2}{\sin r_2}$$

It should be noted that since the values of $\theta_1$ and $\theta_2$ were of the first order of accuracy only, then $r_1$ and $r_2$ are similarly approximate. If these values of $r_1$ and $r_2$ are substituted in the equations for $\theta_1$ and $\theta_2$, and thus for $\theta_3$ and $\theta_4$, the latter will probably not be zero. A second approximation is therefore made by substituting $$\overline{\theta_0 + \theta_3}$$

and $$\overline{\theta_0 + \theta_4},$$

respectively, for $\theta_0$ in the Equations III and IV which are then solved again for $r_1$ and $r_2$, and the same substitution, if desired, repeated.

The foregoing mathematically determined conditions may now be applied to a particular motion picture projector. If the angle of obliquity, $\theta_0$, of the light falling upon the mirrors is 14°, and the least value of P R which is determined by the obliquity and the length of a radial mirror is 1.2 inches, then a value of $$\frac{d}{n} \qquad \qquad 80$$

equal to 1.8 $P_0 R_0$, i. e. 2.16 in., gives a reasonable compromise between excessive path and excessive prism angles. A value of 4.8 inches for $f$ gives a convenient size for the final image under ordinary conditions.

The value of $n$ used for calculation is the mean refractive index of two glasses having suitable dispersions for color correction.

The prism is set so that the emergent ray is given a right angle bend by internal reflection on a vertical plane inclined at 45° to the lens axis, and both deviations, that is to say, the deviation in the obliquity correcting prism and the deviation in the reflecting prism, are separately color corrected. In this case, the refractive indices and dispersions of two suitable glasses are $n_1 = 1.61323$, $n_2 = 1.61334$, and $V_1 = 36.9$, and $V_2 = 57.6$ respectively.

Using these values in solving the foregoing equations, the first evaluation of $\theta_3$ and $\theta_4$ gives:—

$$\theta_3 = +4° 17' \text{ and } \theta_4 = -2° 25'.$$

The second approximation gives:—

$\theta_3 = -2° 39'$ and $\theta_4 = +2° 55'$, whence $r_1 = 21° 30'$ and $r_2 = 10° 3'$, and therefore $i_1 = 36° 15'$ and $i_2 = 16° 19'$ and the total deviation through the prism is 8° 29'.

Although the invention has been described as applied to a particular form of projector, it will be evident that the invention may be used in other apparatus in which the path of the light between the object and image leaves the object or reaches the image other than normally, and in which it is desired to form an evenly focussed image. For example, the above described projector may be used as a camera, in which case the object would be viewed normally and the image formed obliquely; that is to say, the path of the light between the object and its image leaves the object normally and reaches the image obliquely. By inserting a prism of the correct dimensions and refractive index in the path of the light, a substantially evenly focussed image may be obtained.

It will be clear that, in all cases, one or more lenses must be inserted in the light path in order to focus the image. If only one or two lenses are used, these may be formed integral with the correcting prism; that is to say, the incident and emergent surfaces of the prism may be given curvatures equivalent to the curvatures of the lenses which they replace.

We claim:

1. In cinematographic apparatus, the combination with a system of reflectors disposed radially with respect to and rotatable about a common axis and a film movable along a circular path adjacent that defined by the outer edges of said reflectors at half the speed thereof, said reflectors being illuminated by light falling obliquely upon and traversing said film, of means for projecting an image of said film at a point remote therefrom, and means interposed between said film and its image for insuring said image being substantially evenly focused.

2. In cinematographic apparatus, a drum, a series of reflectors radially disposed within said drum, means for rotating said drum and reflectors about the drum axis at a predetermined speed, a light source for emitting light angularly upon said reflectors, means for moving a film between said source and said reflectors at one-half said predetermined speed, an objective lens having its axis transverse to the axis of said drum and said reflectors, and means for directing the light from said reflectors onto said lens parallel to the axis thereof.

3. In cinematographic apparatus, a drum, a series of reflectors radially disposed within said drum and terminating short of the axis thereof whereby to provide a central opening, means for rotating said drum and reflectors about the drum axis at a predetermined speed, a light source for emitting light angularly upon said reflectors, means for moving a film between said source and said reflectors at one-half said predetermined speed, an objective lens within said central opening, said lens having its axis transverse to the axis of said drum and said reflectors, and means for directing the light from said reflectors onto said lens parallel to the axis thereof.

4. In cinematographic apparatus, a drum, a series of reflectors radially disposed within said drum and terminating short of the axis thereof whereby to provide a central opening, means for rotating said drum and reflectors about the drum axis at a predetermined speed, a light source for emitting light angularly upon said reflectors, means for moving a film between said source and said reflectors at one-half said predetermined speed, an objective lens within said central opening, said lens having its axis transverse to the axis of said drum and said reflectors, means for directing the light from said reflectors onto said lens parallel to the axis thereof, and a reflector for directing light away from said series of reflectors.

5. In cinematographic apparatus, a drum, a series of reflectors radially disposed within said drum and terminating short of the axis thereof whereby to provide a central opening, means for rotating said drum and reflectors about the drum axis at a predetermined speed, a light source for emitting light angularly upon said reflectors, means for moving a film between said source and said reflectors at one-half said predetermined speed, an objective lens within said central opening, said lens having its axis transverse to the axis of said drum and said reflectors, means for directing the light from said reflectors onto said lens parallel to the axis thereof, and a reflector for directing light away from said series of reflectors, said last named reflector also being located within said central opening.

MICHAEL BOWMAN-MANIFOLD.
WILLIAM FRANCIS TEDHAM.